United States Patent
Chen et al.

(10) Patent No.: US 8,094,163 B2
(45) Date of Patent: Jan. 10, 2012

(54) METHOD OF DIRECTING A VIEWER'S ATTENTION SUBLIMINALLY IN IMAGE DISPLAY

(75) Inventors: Homer H. Chen, Taipei (TW); Tai-Hsiang Huang, Taipei (TW); Su-Ling Yeh, Taipei (TW); San-Yuan Lin, Taipei (TW); Lin-Kai Bu, Tainan (TW); Ling-Hsiu Huang, Tainan (TW)

(73) Assignees: Himax Technologies Limited, Tainan County (TW); National Taiwan University, Taipei (TW)

(*) Notice: Subject to any disclaimer, the term of this patent is extended or adjusted under 35 U.S.C. 154(b) by 626 days.

(21) Appl. No.: 12/331,359

(22) Filed: Dec. 9, 2008

(65) Prior Publication Data

US 2010/0146528 A1 Jun. 10, 2010

(51) Int. Cl.
*G09G 5/00* (2006.01)
*H04N 5/44* (2006.01)
*H04N 5/445* (2006.01)
*H04N 5/50* (2006.01)
*H04N 7/10* (2006.01)
*G06K 9/40* (2006.01)
*G06F 17/00* (2006.01)

(52) U.S. Cl. ........ 345/581; 345/618; 348/561; 348/563; 348/569; 382/254; 382/274; 715/200; 715/273; 725/32; 725/41

(58) Field of Classification Search .................. 345/581, 345/589, 617–619, 640; 348/577–578, 561, 348/563, 564, 569; 382/163–165, 254–255, 382/274, 299; 715/821–823, 200, 273; 725/32, 725/40–41
See application file for complete search history.

(56) References Cited

U.S. PATENT DOCUMENTS

| | | | |
|---|---|---|---|
| 5,242,306 A * | 9/1993 | Fisher | 434/44 |
| 2004/0257432 A1 * | 12/2004 | Girish et al. | 348/14.08 |
| 2006/0280364 A1 * | 12/2006 | Ma et al. | 382/173 |
| 2008/0259154 A1 * | 10/2008 | Garrison et al. | 348/14.01 |
| 2009/0295787 A1 * | 12/2009 | Yao et al. | 345/418 |
| 2010/0207877 A1 * | 8/2010 | Woodard | 345/156 |

* cited by examiner

*Primary Examiner* — Wesner Sajous
(74) *Attorney, Agent, or Firm* — Stout, Uxa, Buyan & Mullins, LLP

(57) ABSTRACT

A method of directing a viewer's attention in an image display to enhance the perceived image quality and thus the viewer's preference of the image is disclosed. An image with an area of interest (AOI) is provided. The AOI is briefly displayed for a first time period. Subsequently, the image is normally displayed in its entirety for a second time period that is longer than the first time period. As a result, the viewer's attention is involuntarily directed to the AOI in a subliminal manner.

18 Claims, 3 Drawing Sheets providing an image with diminished non-AOI 10 briefly displaying the image with diminished non-AOI 11 normally displaying an entire image 12

METHOD OF DIRECTING A VIEWER'S ATTENTION SUBLIMINALLY IN IMAGE DISPLAY

BACKGROUND OF THE INVENTION

1. Field of the Invention

The present invention generally relates to image display and, more particularly, to a method of directing a viewer's attention to an area of interest in an image in order to enhance the perceived image quality and thus the viewer's preference.

2. Description of the Prior Art

Image displays, which can be described as output devices for presenting visual information, have become indispensable composing elements of modern electronic devices. Image quality of a displayed image may be degraded, for example, due to a limited capacity of processing power or due to the use of a low-power backlight in some electronic devices, such as the portable or handheld devices having limited resources. Under such limitations, the image is usually displayed in a selective manner such that important visual information is displayed in normal quality while other visual information is displayed in lower quality. Unfortunately, the viewer's attention is usually focused randomly on the displayed image, resulting in an intermediate perceptual image quality.

As web browsing on image displays is becoming more prevalent in everyday life, the amount of advertisements on the web grows to attract more customers. Some forms of these online advertisements, such as pop-up ads, more often than not, annoy rather than attract the users and block a substantial area of the image display. Accordingly, most users close these advertisements or ignore them completely.

Conventional image displays do not direct the viewer's attention; therefore, there is a need for an automatic scheme for enhancing perceptual image quality or facilitating online advertising by directing the viewer's attention to an area of interest.

SUMMARY OF THE INVENTION

In view of the foregoing, it is an object of the present invention to provide a method of directing a viewer's attention to an area of interest for enhancing perceptual image quality or facilitating online advertising.

According to a first embodiment, an image with an area of interest (AOI) is provided. The AOI is briefly displayed. Subsequently, the image is normally displayed in its entirety. The AOI in the briefly displayed image may alternatively be substituted by a cue. As a result, the viewer's attention is involuntarily directed to the AOI in a subliminal manner.

According to a second embodiment, the briefly displayed step and the normally displayed step in the first embodiment may be repeated. As a result, the viewer's attention is continuously directed to the AOI in a subliminal manner and is affected by the mere exposure.

According to a third embodiment, the AOI is briefly displayed, followed by normally displaying the image in its entirety. Subsequently, a diminished AOI is briefly displayed, followed by normally displaying the image in its entirety. As a result, the viewer's eyes are continuously directed to the AOI in a subliminal manner and unconsciously perceive the AOI with glitter or flash.

DETAILED DESCRIPTION OF THE INVENTION

Figure 1A:
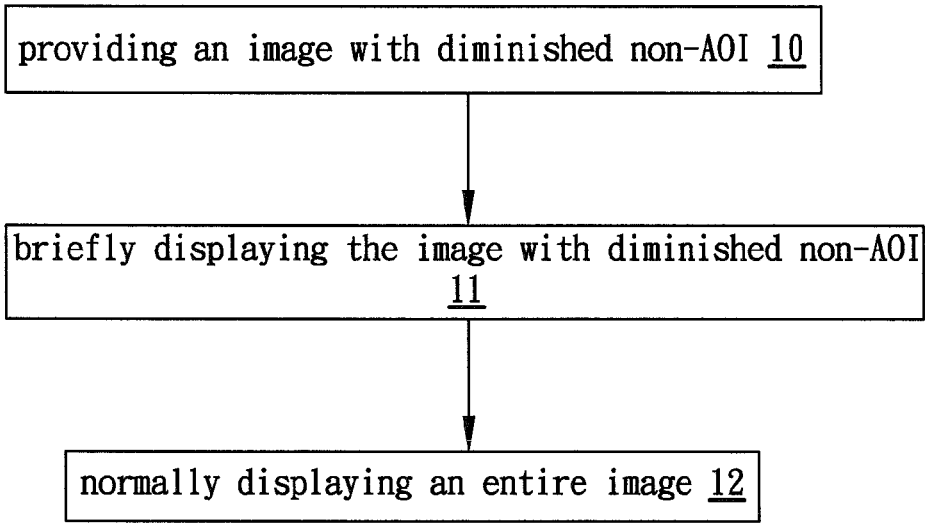
FIG. 1A shows a flow diagram of a method of directing a viewer's attention to an area of interest (AOI) in an image according to a first embodiment of the present invention.
Figure 1B:
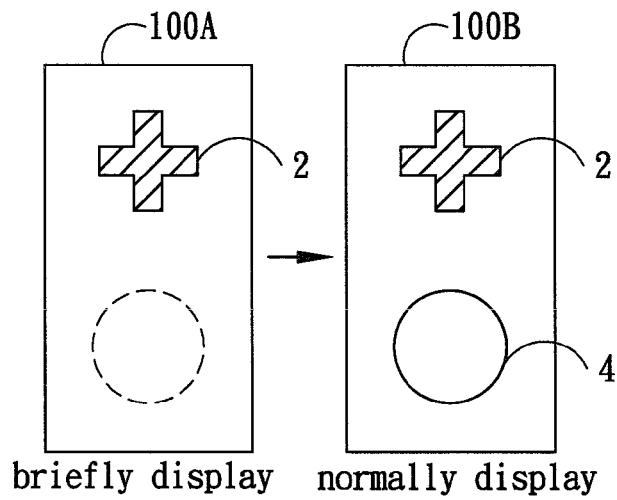
FIG. 1B shows exemplary images that are displayed in sequence according to the operations of the flow diagram in FIG. 1A.

FIG. 1A shows a flow diagram of a method of image display, particularly of directing a viewer's eyes or attention to an area of interest (AOI) in an image according to a first embodiment of the present invention. FIG. 1B shows exemplary images that are displayed in sequence according to the operations of the flow diagram in FIG. 1A. The term "image" in this specification is defined as either a still image (commonly referred to as a picture) or a moving image (commonly referred to as a video). The "area of interest" (AOI) in this specification may be an object, a pattern or a region. For example, with respect to the images in FIG. 1B, the AOI is the upper half of the image that includes an object 2 (a cross in the example). The non-AOI is the other part (i.e., the lower half) of the image that includes another object 4 (a circle in the example).

In step 10, an image 100A with diminished non-AOI is provided. In the embodiment, the non-AOI may be diminished by lowering its contrast, or in general, decreasing its image characteristic, such as brightness and/or color. For example, the diminished non-AOI may be obtained by altering the luminance distribution (or histogram) of the non-AOI image in a way such that the ratio of brightness to darkness is substantially reduced. In an extreme but preferred exemplary embodiment, the magnitude of all grey levels of the non-AOI is completely reduced to zero. In other words, the non-AOI image is completely removed from the whole image 100A. The image 100A is then briefly displayed in step 11. The display duration of the image 100A may last (but is not limited to) tens or hundreds of milliseconds (ms) in the present embodiment. In general, the briefly displayed duration mentioned in this specification should be short enough such that the image (e.g., 100A) is unrecognizable by the viewer's conscious mind but can be perceived unconsciously by the viewer. The determination of suitable display duration may generally depend on what is displayed in the image and on how the image is displayed. Specifically, the suitable display duration may be determined in spatial domain according to the arrangement of objects or patterns in the image. The suitable display duration may otherwise be determined in temporal domain according to, for example, the refresh rate or the frame rate of a display device. Subsequently, an entire image 100B is normally displayed in step 12 with the display duration being longer than that in step 11. In general, the normal display duration should be long enough, for example (but is not limited to), a second or more such that the image 100B is recognizable by the viewer's conscious mind.

As a result, the viewer's eyes are involuntarily directed to the AOI (i.e., the upper half of the image) in a subliminal manner due to the abrupt, but unconsciously perceived, display of the AOI of the image 100A. With respect to the preferred exemplary embodiment in which the non-AOI image is completely removed from the entire image 100A, the AOI of the image 100A acts as an abrupt and sudden onset, and then captures the viewer's eyes and attention. This preferred exemplary embodiment renders more attentional capture than other embodiments with incompletely diminished non-AOI. The subliminal phenomenon is discussed in a disclosure entitled "Grabbing attention without knowing: Automatic capture of attention by subliminal spatial cues," Visual Cognition (2007), 15, 779-788, by Manon Mulckhuyse et al., the disclosure of which is hereby incorporated by reference.

Figure 1C:
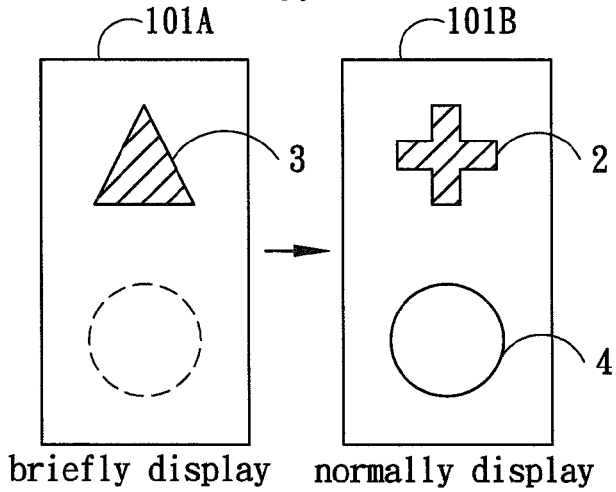
FIG. 1C shows an alternative to the embodiment of FIG. 1B.

FIG. 1C shows an alternative to the embodiment of FIG. 1B. In the image 101A of FIG. 1C, a cue 3 instead of the AOI object 2 is briefly displayed. The cue 3 (a triangle in the example) is a pattern or object that is different from the AOI object (e.g., the cross 2). Subsequently, an entire image 101B is normally displayed. FIG. 1C works similarly to FIG. 1B in that the viewer's eyes may be involuntarily directed to the AOI (i.e., the upper half of the image) in a subliminal manner due to the abrupt, but unconsciously perceived, display of the cue of the image 101A.

The embodiment shown in FIGS. 1A-1C may be employed in a variety of applications. For example, the embodiment may be employed to direct the viewer's focus away from a low-quality image area of a resource-limited electronic device. As a result, the viewer gives little attention to other low-quality image areas, and the overall perceptual image quality is thus enhanced. In another example, the embodiment may be employed to direct the viewer's focus to an online advertisement, or even be employed to display the advertisement per se that can be unconsciously perceived by the users.

Figure 2A:
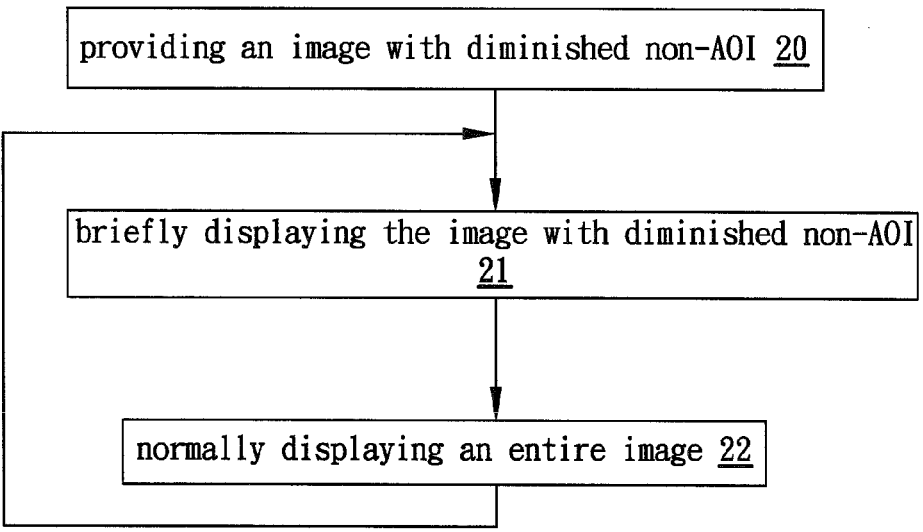
FIG. 2A shows a flow diagram of a method of directing a viewer's attention to an area of interest (AOI) in an image according to a second embodiment of the present invention.
Figure 2B:
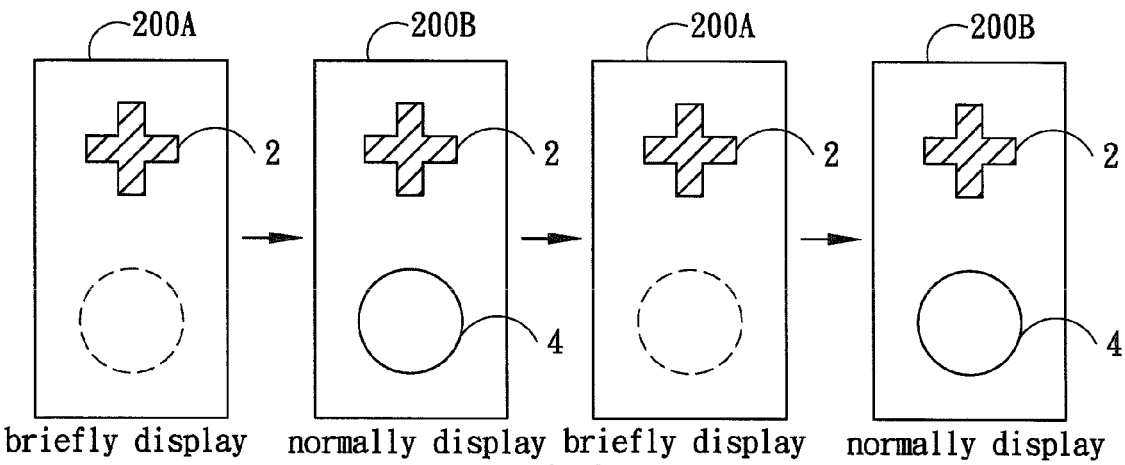
FIG. 2B shows exemplary images that are displayed in sequence according to the operations of the flow diagram in FIG. 2A.

FIG. 2A shows a flow diagram of a method of image display, particularly of directing a viewer's eyes or attention to an AOI in an image according to a second embodiment of the present invention. FIG. 2B shows exemplary images that are displayed in sequence according to the operations of the flow diagram in FIG. 2A.

In step 20, an image 200A with diminished non-AOI is provided. In the embodiment, the non-AOI may be diminished by lowering its contrast or, preferably, by completely removing the non-AOI image from the whole image 200A. The image 200A is then briefly displayed in step 21. Subsequently, an entire image 200B is normally displayed in step 22 with the display duration being longer than that in step 21. Furthermore, in the present embodiment, the performance of steps 21 and 22 is repeated one or more times (two iterations are shown in FIG. 2B).

As a result, the viewer's eyes are not only involuntarily directed to the AOI (i.e., the upper half of the image) in a subliminal manner, but are also continuously directed to the same AOI. Through continuously attracting the viewer's attention to the AOI and lengthening the exposure time of that area, the present embodiment has the mere exposure effect that causes the viewer to prefer images in the AOI, primarily because they are familiar with these images due to longer exposure to them. In other words, by analogy, the more a person is seen by the viewer, the more pleasing and likable that person may appear to be to the viewer.

Figure 2C:
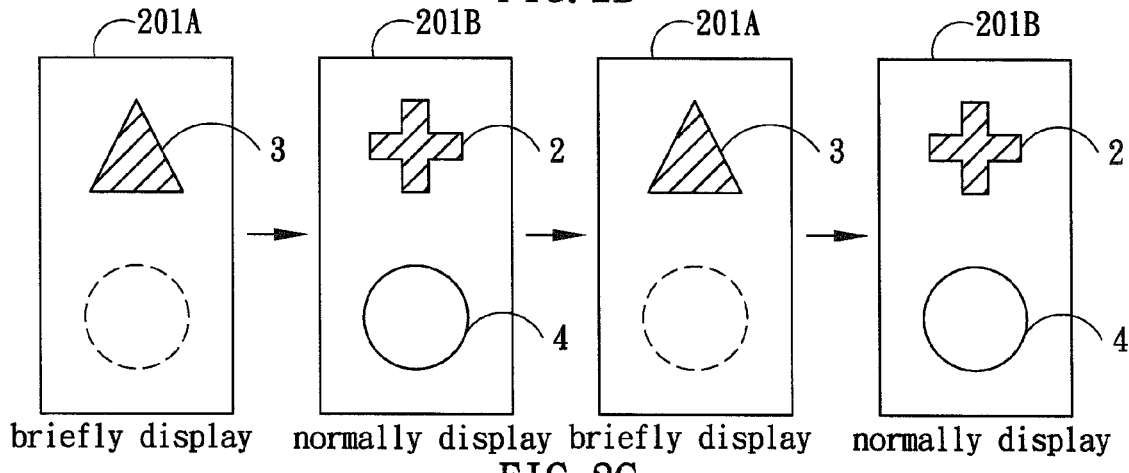
FIG. 2C shows an alternative to the embodiment of FIG. 2B.

FIG. 2C shows an alternative to the embodiment of FIG. 2B. In the image 201A of FIG. 2C, a cue 3 (a triangle in the example) instead of the AOI object is briefly displayed. Subsequently, an entire image 201B is normally displayed. The performance of the steps 21 and 22 is repeated one or more times (two iterations are shown in FIG. 2C).

The embodiment shown in FIGS. 2A-2C may be employed in a variety of applications as discussed above. Moreover, the present embodiment may be particularly applied to online advertising owing to the mere exposure effect.

Figure 3A:
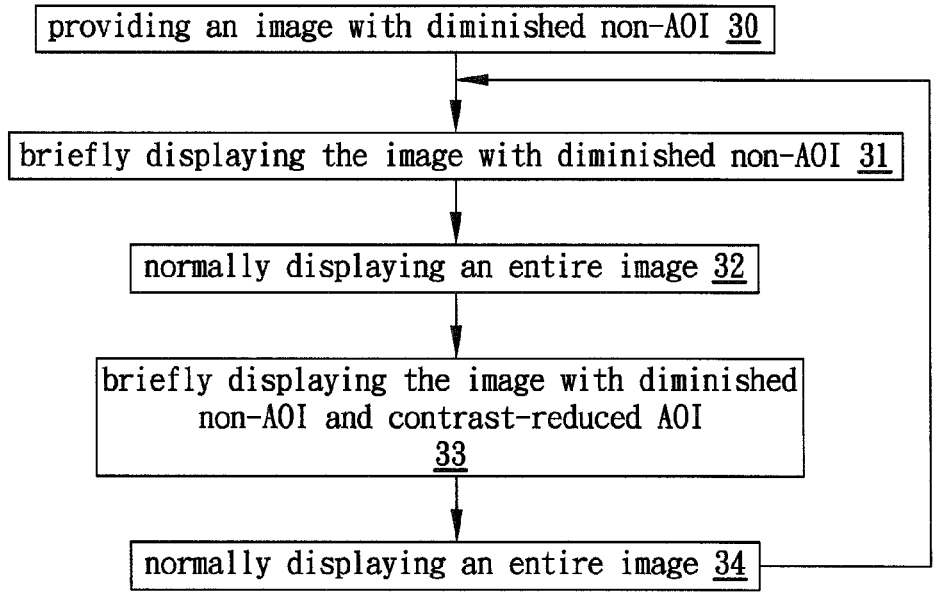
FIG. 3A shows a flow diagram of a method of directing a viewer's attention to an area of interest (AOI) in an image according to a third embodiment of the present invention.
Figure 3B:
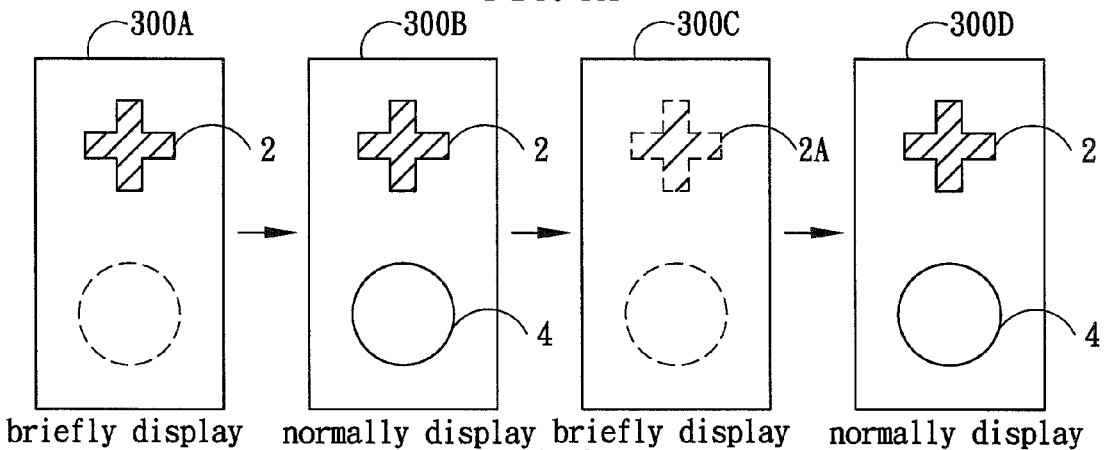
FIG. 3B shows exemplary images that are displayed in sequence according to the operations of the flow diagram in FIG. 3A.

FIG. 3A shows a flow diagram of a method of image display, particularly of directing a viewer's eyes or attention to an AOI in an image according to a third embodiment of the present invention. FIG. 3B shows exemplary images that are displayed in sequence according to the operations of the flow diagram in FIG. 3A.

In step 30, an image 300A with diminished non-AOI is provided. In the embodiment, the non-AOI may be diminished by lowering its contrast or, preferably, by completely removing the non-AOI image from the entire image 300A. The image 300A is then briefly displayed in step 31. Subsequently, an entire image 300B is normally displayed in step 32 with the display duration being longer than that in step 31. Furthermore, in the present embodiment, another image 300C, with diminished non-AOI and with contrast-reduced (or completely removed) AOI, is provided and displayed in step 33. Specifically, the contrast-reduced (or completely removed) AOI (i.e., the cross 2A) may have a contrast intermediate between that of the normal AOI (the cross 3) and that of the diminished non-AOI. In general, the contrast-reduced (or completely removed) AOI may be another diminished AOI (the cross 3A) that may have the image characteristic (such as contrast, brightness and/or color) intermediate between that of the normal AOI (the cross 3) and that of the diminished non-AOI. Subsequently, an entire image 300D is normally displayed in step 34. The performance of steps 31 through 34 may be repeated one or more times.

As a result, the viewer's eyes are not only continuously directed involuntarily to the AOI (i.e., the upper half of the image) in a subliminal manner, but are also unconsciously perceiving the AOI with glitter or flash.

Figure 3C:
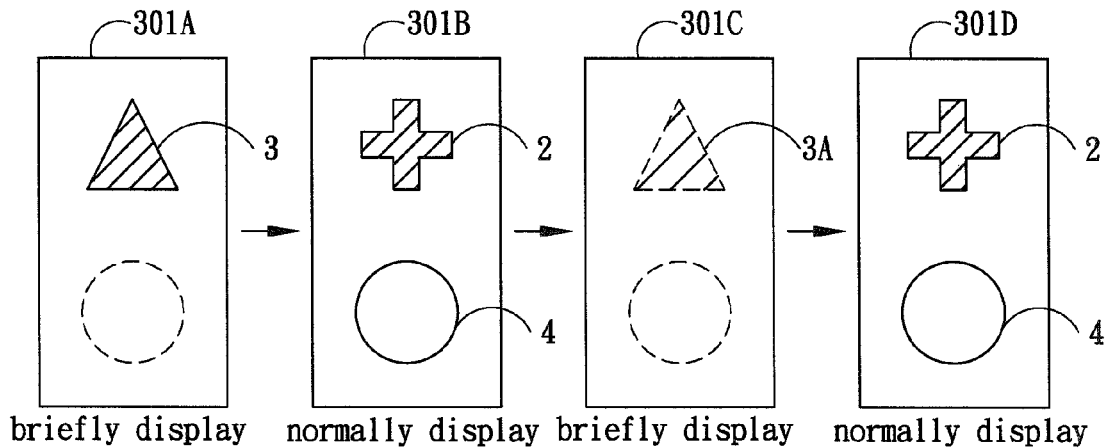
FIG. 3C shows an alternative to the embodiment of FIG. 3B.

FIG. 3C shows an alternative to the embodiment of FIG. 3B. In the image 301A of FIG. 3C, a cue 3 instead of the AOI object is briefly displayed. Subsequently, an entire image 301B is normally displayed. Another image 301C, with diminished non-AOI and contrast-reduced cue 3A, is provided and displayed. Subsequently, an entire image 301D is normally displayed.

Although specific embodiments have been illustrated and described, it will be appreciated by those skilled in the art that various modifications may be made without departing from the spirit and scope of the present invention, which is intended to be limited solely by the appended claims.

What is claimed is:

1. A method of directing a viewer's attention, comprising:
using a processor to perform the steps of:
providing an image having an area of interest (AOI);
briefly displaying the AOI for a first time period, wherein the first time period is short enough such that the AOI in the briefly displayed image is unrecognizable by the viewer, but is perceived unconsciously; and
normally displaying the image in its entirety for a second time period that is longer than the first time period, wherein the second time period is long enough such that the image consciously recognized by the viewer;

wherein a non-AOI other than the AOI in the briefly displayed image is diminished by lowering an image characteristic thereof.

2. The method of claim 1, wherein the image characteristic includes one or more of contrast, brightness and color.

3. The method of claim 1, wherein the non-AOI is diminished by completely removing the non-AOI from the briefly displayed image.

4. The method of claim 1, wherein performance of one or more of the step of briefly displaying the AOI and the step of normally displaying the entire image is repeated at least one time.

5. A method of directing a viewer's attention, comprising:
using a processor to perform the steps of:
providing an image having an area of interest (AOI), which is substituted by a cue that is different from the AOI;
briefly displaying the substituted cue for a first time period, wherein the first time period is short enough such that the substituted cue in the briefly displayed image is unrecognizable by the viewer's conscious mind, but is perceived unconsciously; and
normally displaying the image in its entirety for a second time period, that is longer than the first time period, wherein the second time period is long enough such that the image is consciously recognized by the viewer;
wherein an area other than the AOI (non-AOI) in the briefly displayed image is diminished by lowering an image characteristic thereof.

6. The method of claim 5, wherein the image characteristic includes contrast, brightness or color.

7. The method of claim 5, wherein the non-AOI is diminished by completely removing the non-AOI from the briefly displayed image.

8. The method of claim 5, wherein performance of one or more of the step of briefly displaying the substituted cue and the step of normally displaying the entire image is repeated at least one time.

9. A method of directing a viewer's attention, comprising:
using a processor to perform the steps of:
providing an image having an area of interest (AOI);
briefly displaying the AOI for a first time period;
normally displaying the image in its entirety for a second time period, that is longer than the first time period;
providing and briefly displaying, for a third time period, an image with a diminished AOI, wherein one or more of the first time period and the third time period is short enough such that one or more of the AOI and the diminished AOI in the briefly displayed image is unrecognizable by the viewer, but is perceived unconsciously; and
normally displaying the image in its entirety for a fourth time period that is longer than the third time period, wherein the second time period and, the fourth time period each is long enough such that the image is consciously recognized by the viewer;
wherein area other than the AOI (non-AOI) in the briefly displayed image is diminished by lowering the image characteristic thereof.

10. The method of claim 9, wherein the image characteristic of the diminished AOI is intermediate between the AOI and the diminished non-AOI.

11. The method of claim 9, wherein the image characteristic includes one or more of contrast, brightness and color.

12. The method of claim 9, wherein one or more of the non-AOI and the AOI is diminished by completely removing one or more of the non-AOI and the AOI from the briefly displayed image.

13. The method of claim 9, wherein performance of one or more of the step in the first time period, the step in the second time period, the step in the third time period, and the step in the fourth time period is repeated, at least one time.

14. A method of directing a viewer's attention, comprising:
using a processor to perform the steps of:
providing an image having an area of interest (AOI), which is substituted by a cue that is different from the AOI;
briefly displaying the substituted cue for a first time period;
normally displaying the image in its entirety for a second time period that is longer than the first time
providing and briefly displaying, for a third time period, a diminished cue, wherein one or more of the first time period and the third time period is short enough such that one or more of the cue and the diminished cue is unrecognizable by the viewer, but is perceived unconsciously; and
normally displaying the image in its entirety for a fourth time period that is longer than the third time period, wherein the second time period and the fourth time period each is long enough such that the image is consciously recognized by the viewer;
wherein an area (non-AOI) other than the AOI in the briefly displayed image is diminished by lowering an image characteristic thereof.

15. The method of claim 14, wherein the image characteristic of the diminished cue is intermediate between one or more of the AOI and the diminished non-AOI.

16. The method of claim 14, wherein the image characteristic includes one or more of contrast, brightness and color.

17. The method of claim 14, wherein one or more of the non-AOI and the cue is diminished by completely removing one or more of the non-AOI and the cue from the briefly displayed image.

18. The method of claim 14, wherein performance of one or more of the step in the first time period, the step in the second time period, the step in the third time period, and the step in the fourth time period is repeated at least one time.

* * * * *